US012644195B2

(12) United States Patent
Jeong

(10) Patent No.: US 12,644,195 B2
(45) Date of Patent: *Jun. 2, 2026

(54) METHOD FOR SIMULTANEOUSLY ACHIEVING SUPERHYDROPHOBIC AND SUPEROLEOPHOBIC SURFACE ON 3,000 SERIES ALUMINUM ALLOY IN ANODIC OXIDATION PROCESS WITHOUT PRE-PATTERNING STEP

(71) Applicant: DONG-EUI UNIVERSITY INDUSTRIAL-ACADEMIC COOPERATION FOUNDATION, Busan (KR)

(72) Inventor: Chanyoung Jeong, Busan (KR)

(73) Assignee: DONG-EUI UNIVERSITY INDUSTRIAL-ACADEMIC COOPERATION FOUNDATION, Busan (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/848,811

(22) PCT Filed: Nov. 16, 2022

(86) PCT No.: PCT/KR2022/018029

§ 371 (c)(1),
(2) Date: Apr. 15, 2025

(87) PCT Pub. No.: WO2023/182607

PCT Pub. Date: Sep. 28, 2023

(65) Prior Publication Data

US 2025/0243598 A1 Jul. 31, 2025

(30) Foreign Application Priority Data

Mar. 24, 2022 (KR) ........................ 10-2022-0036888

(51) Int. Cl.

| | |
|---|---|
| ***C25D 11/12*** | (2006.01) |
| ***C09D 7/20*** | (2018.01) |
| ***C09D 183/04*** | (2006.01) |
| ***C25D 11/18*** | (2006.01) |

(52) U.S. Cl.

CPC ................ *C25D 11/12* (2013.01); *C09D 7/20* (2018.01); *C09D 183/04* (2013.01); *C25D 11/18* (2013.01)

(58) Field of Classification Search

None

See application file for complete search history.

(56) References Cited

U.S. PATENT DOCUMENTS

| | | | | |
|---|---|---|---|---|
| 2012/0258313 A1 | 10/2012 | Wen et al. | | |
| 2013/0216779 A1* | 8/2013 | Hofmeister | G03F 7/0002 | 428/141 |
| 2015/0368824 A1* | 12/2015 | Lim | C25D 11/08 | 205/190 |

FOREIGN PATENT DOCUMENTS

| | | |
|---|---|---|
| JP | 2013-514841 A | 5/2013 |
| JP | 2016-083812 A | 5/2016 |
| JP | 2018-009088 A | 1/2018 |
| KR | 10-2018-0134562 A | 12/2018 |
| KR | 10-2187089 B1 | 12/2020 |

OTHER PUBLICATIONS

Kim et al. "Anodized Aluminum Oxide/Polydimethylsiloxane Hybrid Mold for Roll-to-Roll Nanoimprinting" Adv. Funct. Mater. 2018, 28, 180019 (Year: 2018).*

Supporting information of Kim et al. "Anodized Aluminum Oxide/Polydimethylsiloxane Hybrid Mold for Roll-to-Roll Nanoimprinting" Adv. Funct. Mater. 2018, 28, 180019 (Year: 2018).*

International Search Report for PCT/KR2022/018029 dated Mar. 13, 2023.

* cited by examiner

*Primary Examiner* — Wojciech Haske

(74) *Attorney, Agent, or Firm* — Sughrue Mion, PLLC

(57) ABSTRACT

The present invention relates to a method for simultaneously achieving a superhydrophobic and superoleophobic surface on a 3,000 series aluminum alloy in an anodic oxidation process without a pre-patterning step, wherein a uniform anodic oxide film can be produced even without a pre-patterning step, thus making it possible to reduce manufacturing costs, the anodic oxide film can be imparted with superhydrophobicity and superoleophobicity due to a coating composition in which a cross-linked PDMS derivative represented by chemical formula 1 and an organic solvent are used in a specific mixing ratio, the coating composition has a low manufacturing cost and has the effect of being applicable to the coating of a microstructured oxide film since the coating film thickness can be adjusted to several to several tens of nm, and the method can be useful for creating a machine learning database for developing 3,000 series aluminum alloy surface treatment technology.

15 Claims, 10 Drawing Sheets

【Fig. 1】
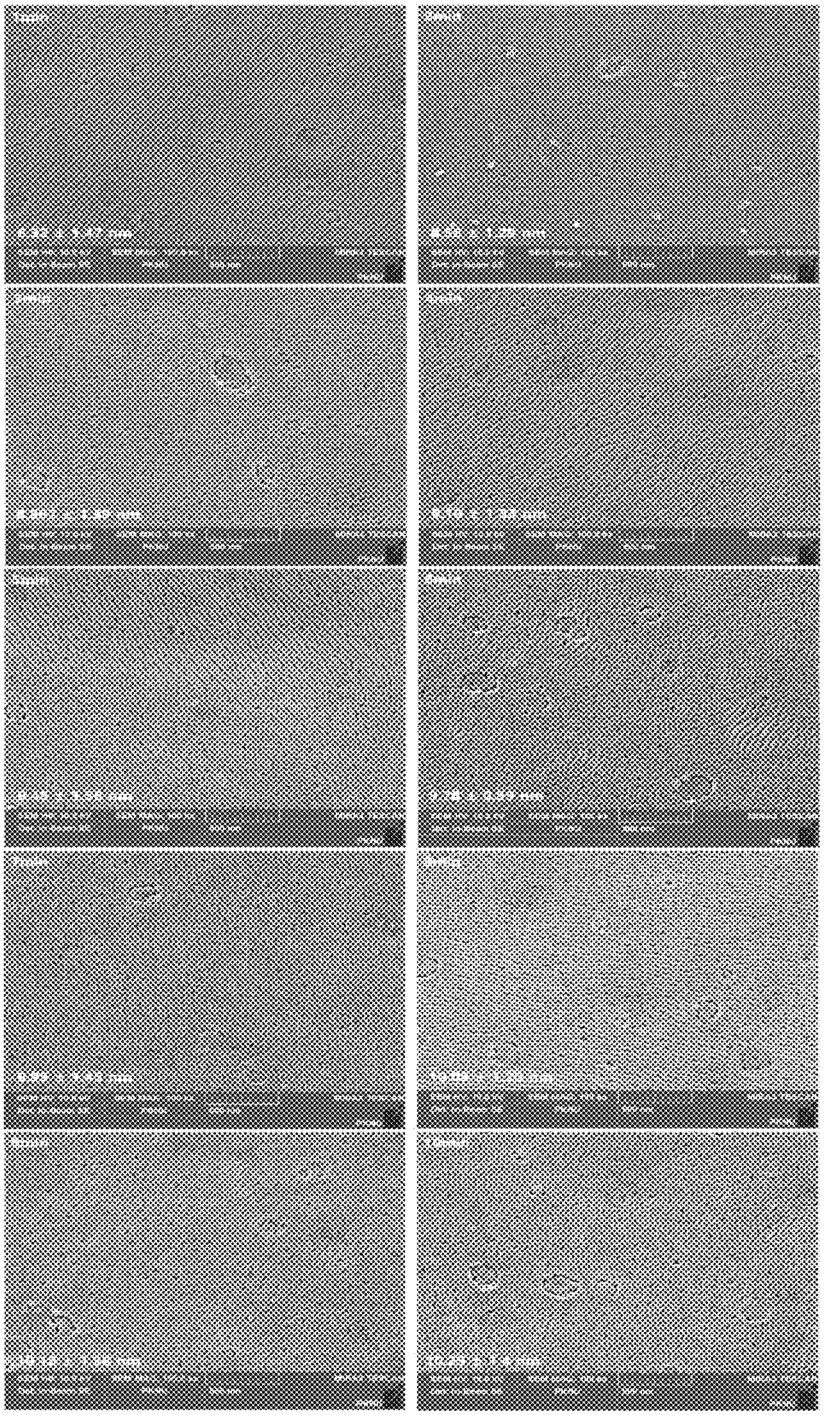

【Fig. 2】
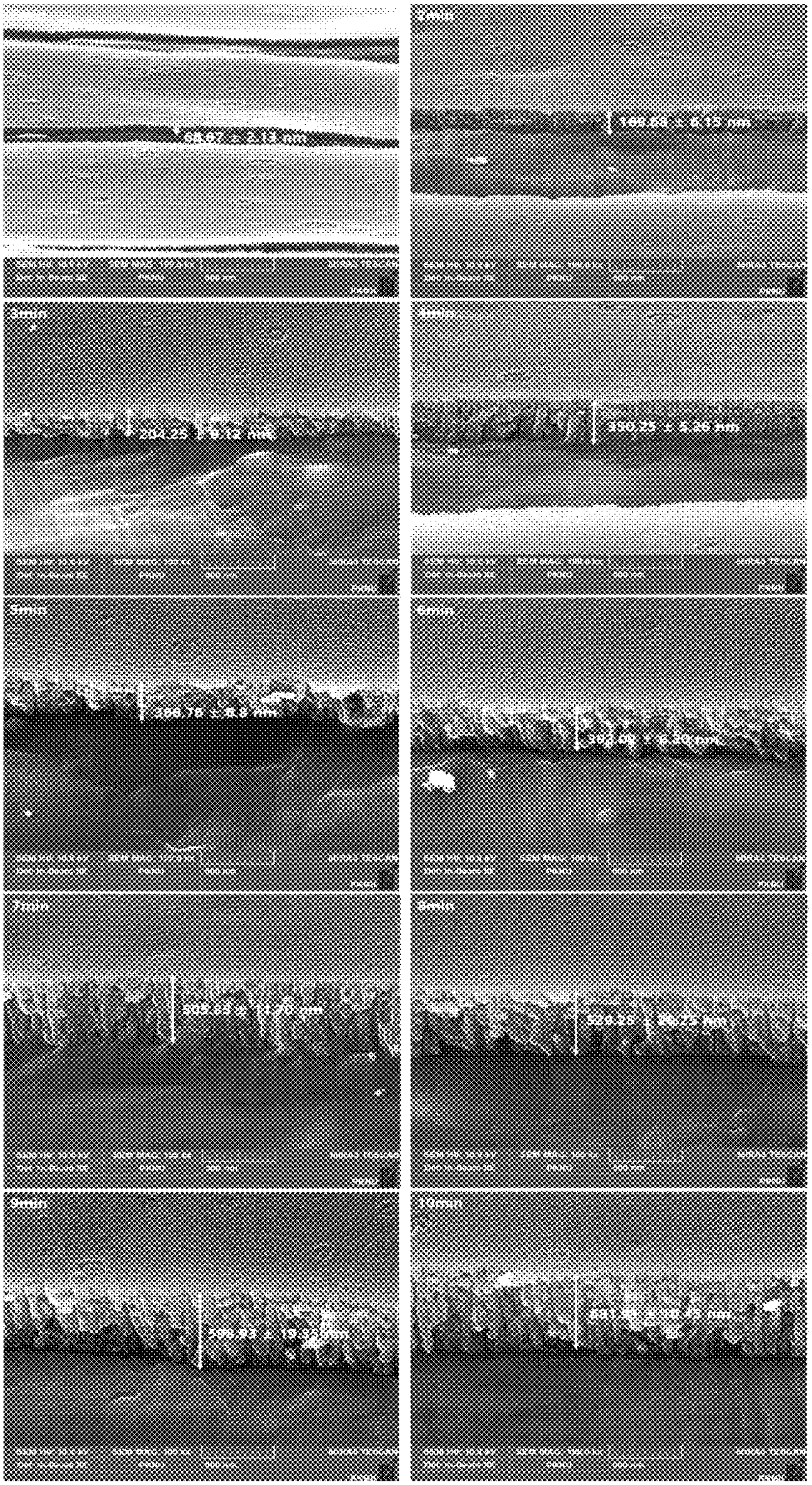

【Fig. 3】
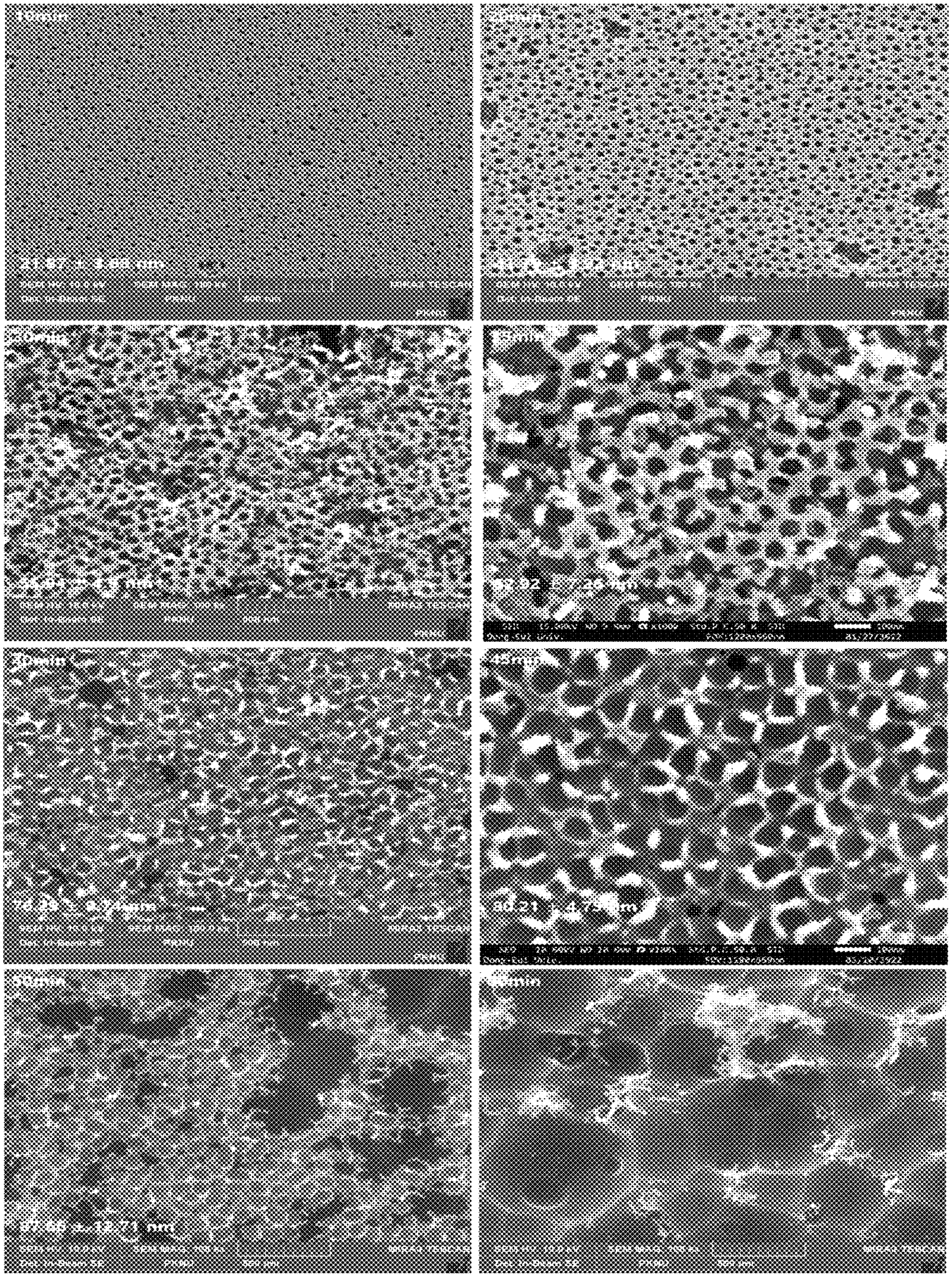

【Fig. 4】
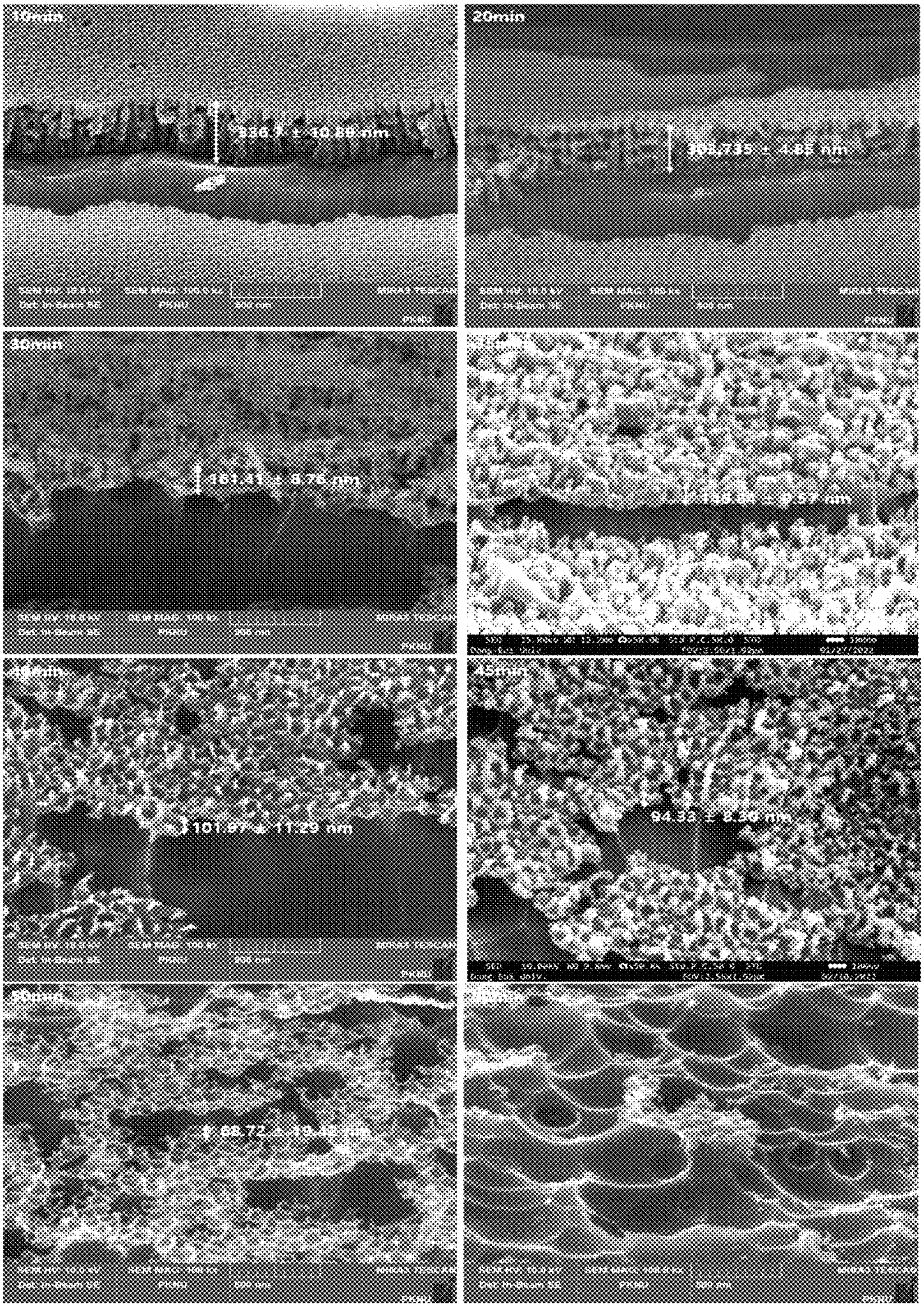

【Fig. 5】
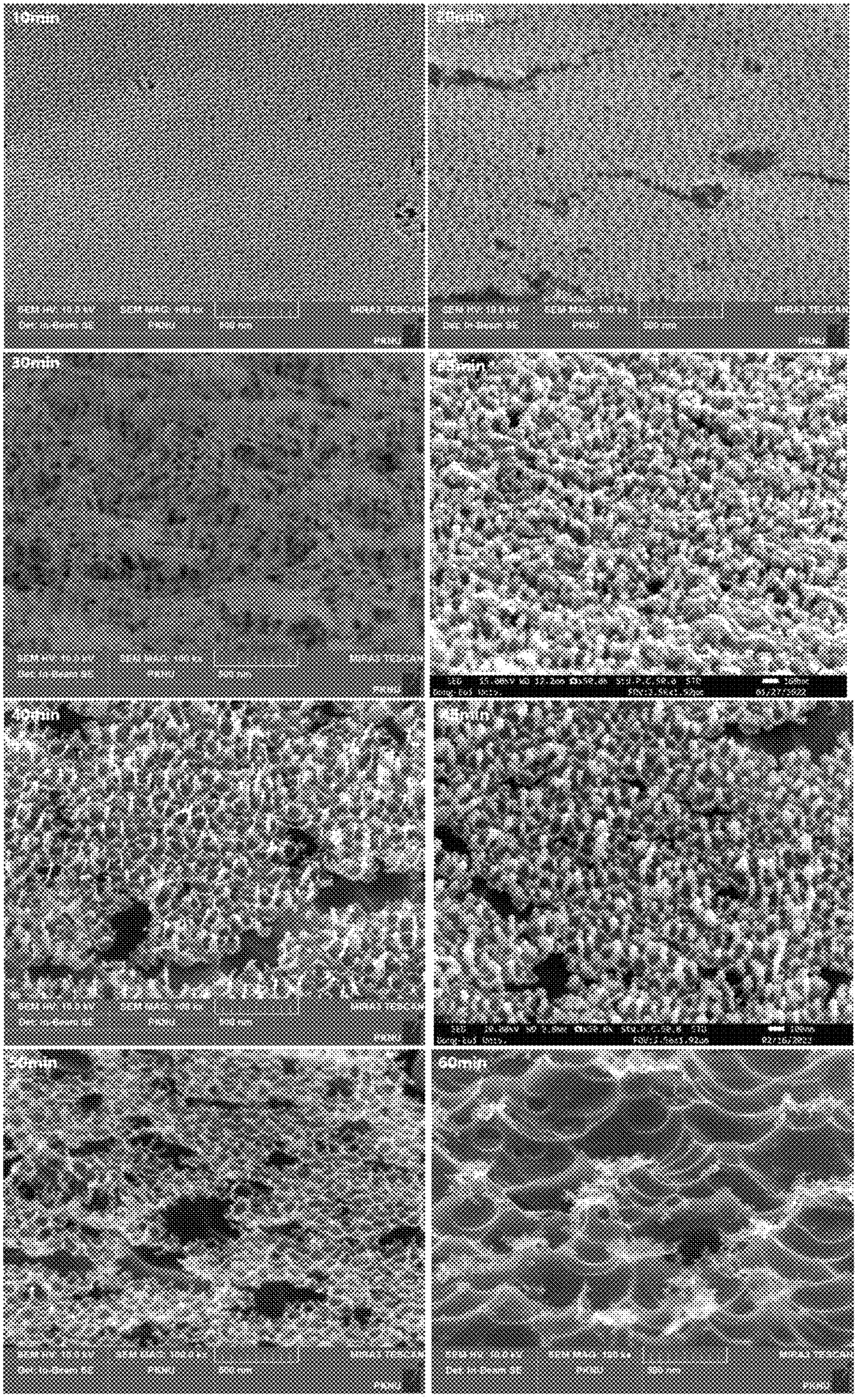

【Fig. 6】
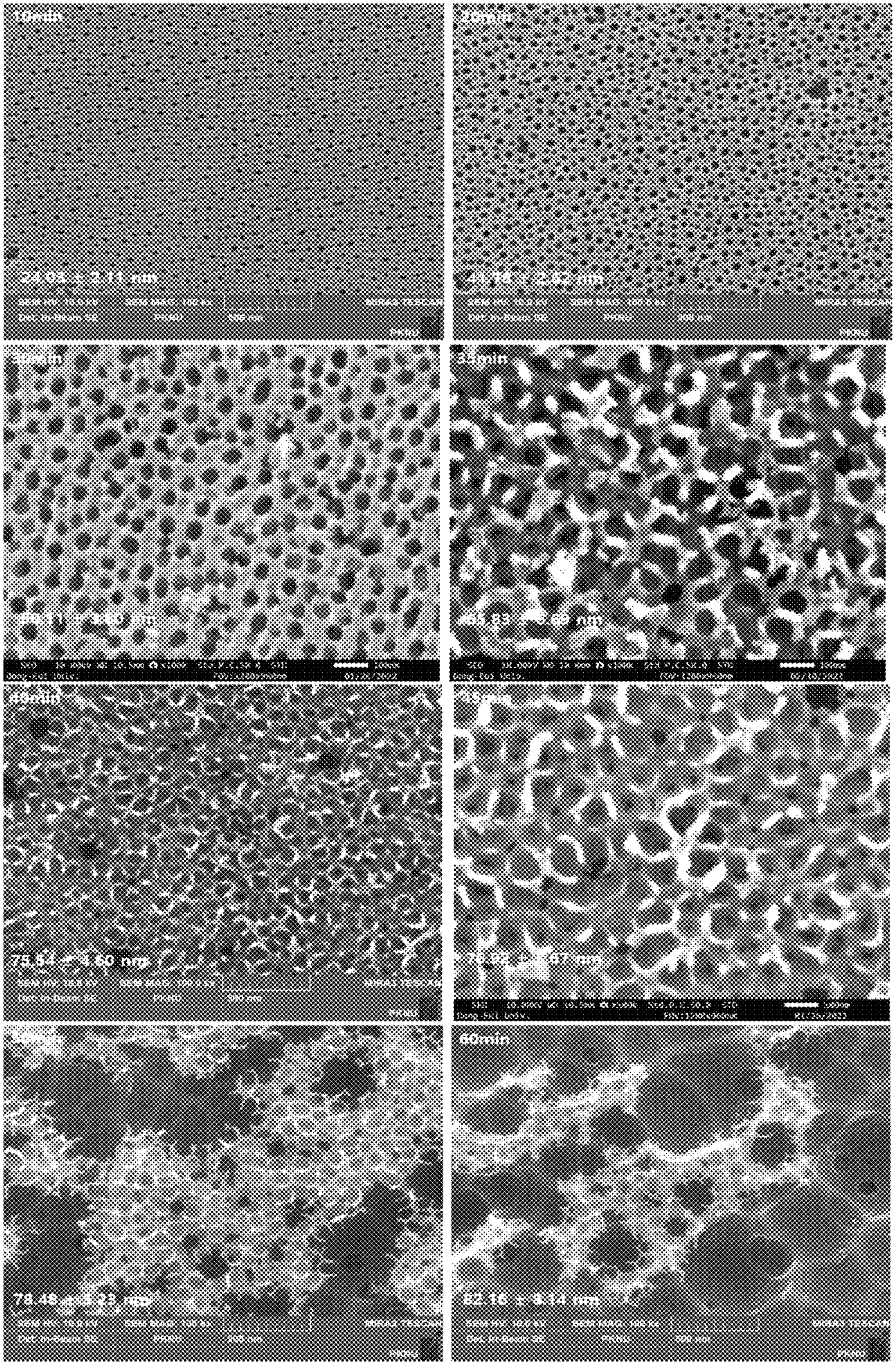

【Fig. 7】
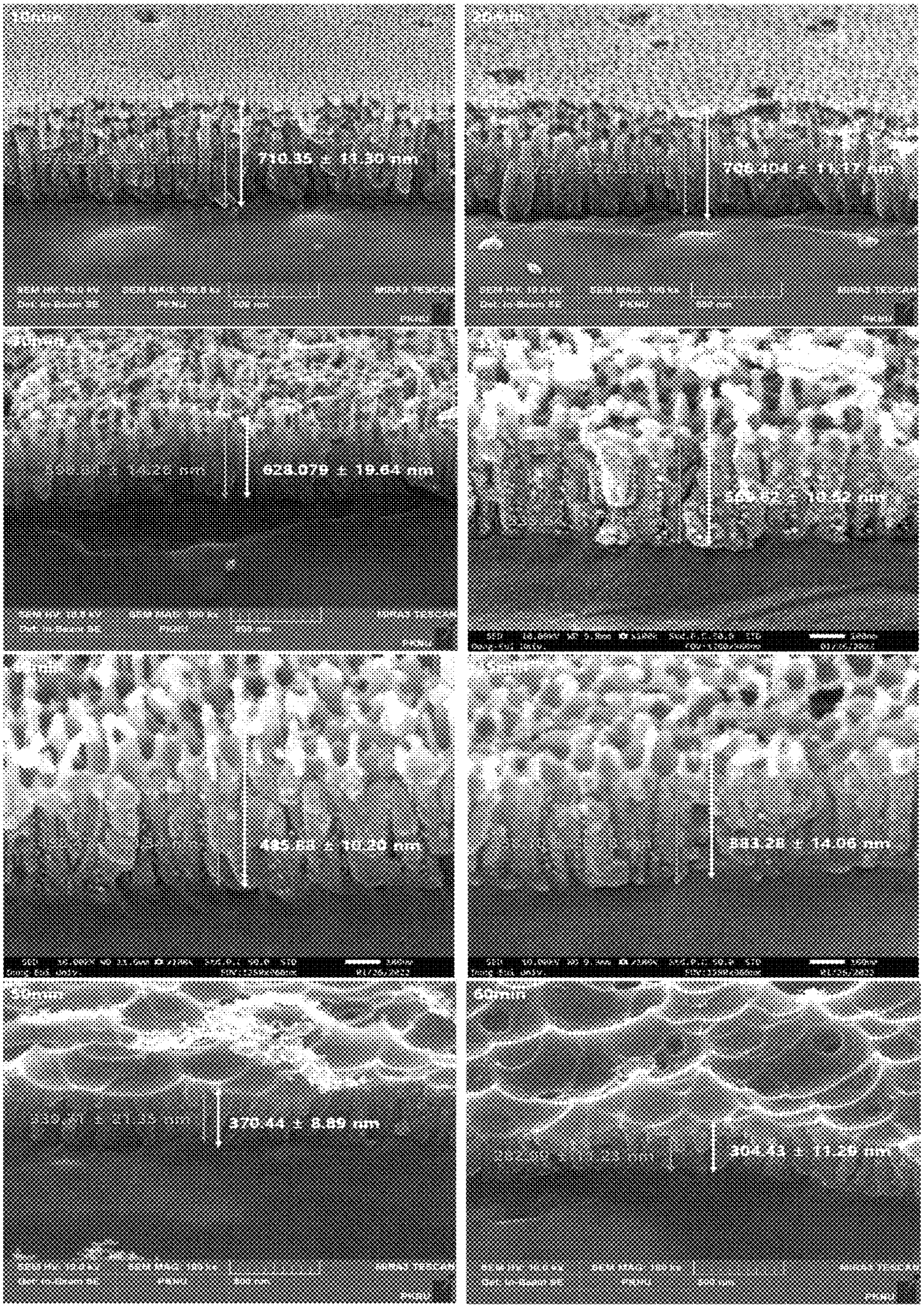

【Fig. 8】
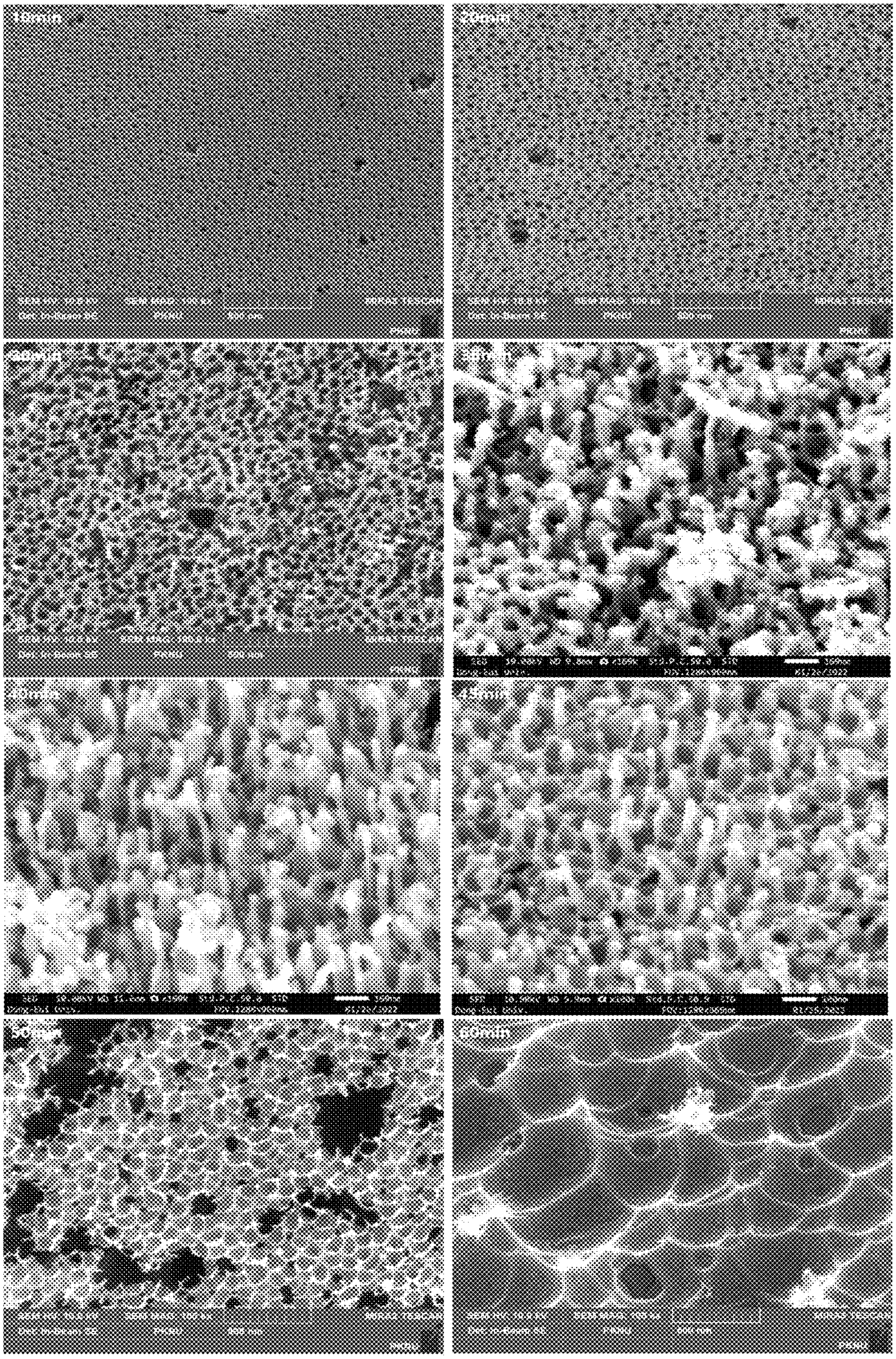

【Fig. 9】
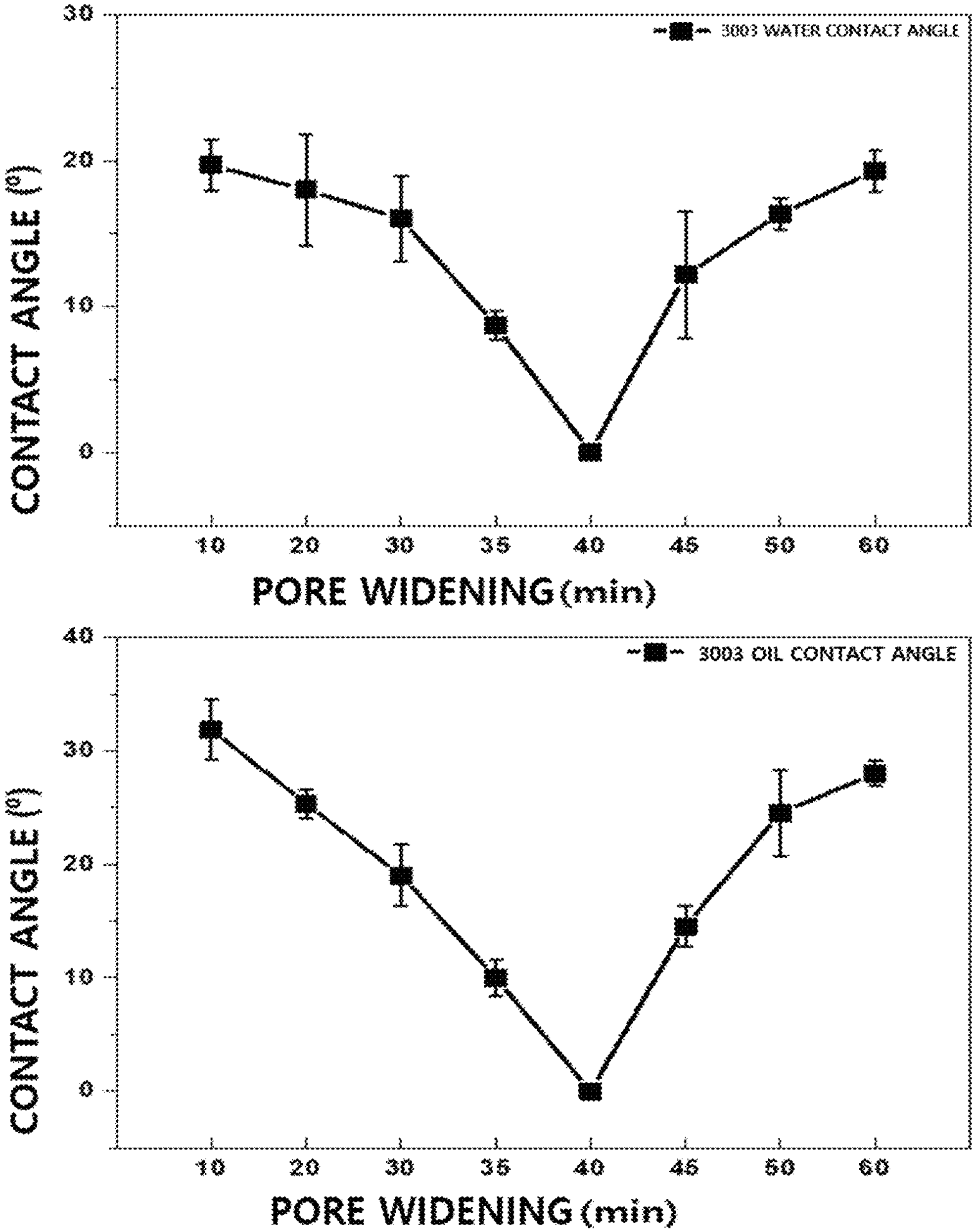

【Fig. 10】
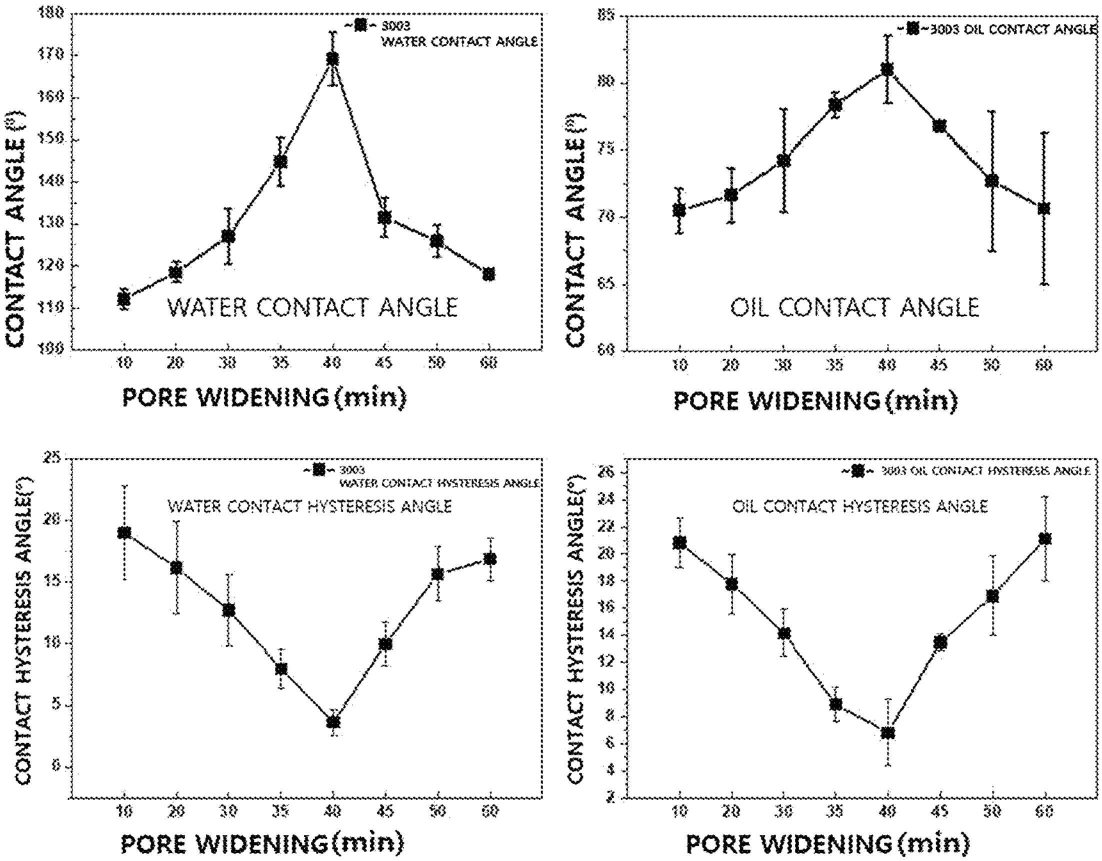

METHOD FOR SIMULTANEOUSLY ACHIEVING SUPERHYDROPHOBIC AND SUPEROLEOPHOBIC SURFACE ON 3,000 SERIES ALUMINUM ALLOY IN ANODIC OXIDATION PROCESS WITHOUT PRE-PATTERNING STEP

CROSS REFERENCE TO RELATED APPLICATIONS

This application is a National Stage of International Application No. PCT/KR2022/018029 filed Nov. 16, 2022, claiming priority based on Korean Patent Application No. 10-2022-0036888 filed Mar. 24, 2022, the entire disclosures of which are incorporated herein by reference.

TECHNICAL FIELD

The present invention relates to a method for simultaneously achieving a superhydrophobic and superoleophobic surface on a 3000 series aluminum alloy in an anodic oxidation process without a pre-patterning step and anodic oxidation process condition data obtained from the present invention may be utilized for machine learning.

BACKGROUND ART

Generally, hydrophobicity and oleophobicity refer to properties of being difficult to get wet by water and oil, respectively and superhydrophobicity/superoleophobicity are generally defined in the field that a contact angle of water which is in contact with a surface of a solid is 150° or larger and a contact angle of oil is 150° or larger, respectively.

Recently, the superhydrophobic surface having a water contact angle of 150° or larger has attracted considerable interest with its importance in both fundamental studies and practical applications. The superhydrophobicity and superoleophobicity refer to a physical property of a surface of an object which is extremely difficult to be wet with water and oil. For example, leaves of plants, wings of insects, or wings of birds possess the ability to naturally remove any external contaminants without a special removal process or prevent contamination in the first place. This is because the leaves of plants, the wings of insects, and the wings of birds have superhydrophobicity.

The wettability is a main surface characteristic of a solid material and is mainly controlled by both a chemical composition and geometric micro/nanostructure. Wettable surfaces have attracted much attention due to their potential applications in various fields such as oil-water separation, antireflection, anti-bioadhesion, anti-sticking, anti-contamination, self-cleaning, and fluid turbulence suppression.

In the meantime, although there have been several reports on the manufacturing of superhydrophobic aluminum, superhydrophobicity/superoleophobicity on a metal base have received relatively little attention.

As air pollution has become more serious due to recent environmental pollution and the occurrence of yellow dust and fine dust has increased, it is common to operate a ventilation system to purify the indoor air rather than opening windows to ventilate. Further, in order to remove living dust, food odors, or cigarette odors generated in residential, business, and commercial facilities such as homes, workplaces, industrial sites, restaurants, offices, restrooms or bathrooms, various harmful odors generated during work, harmful air such as carbon monoxide, fine dust, and oil vapor, ventilation devices are operated on a regular basis.

Such ventilation devices are usually implemented by complex facilities such as ventilation systems that are systematized and installed in specific locations to automatically operate depending on the level of indoor pollution or by window-type ventilation fans that are installed on walls adjacent to the outside and simply circulate the air inside and outside.

However, these ventilators have the problem that dust is inevitably accumulated on the inside and outside of the ventilator when used for a certain period of time, which is unsanitary and requires the troublesome task of disassembling and cleaning the ventilator to remove the dust.

Particularly, ventilators installed in restaurants or places where oil vapor is generated do not have any filtering devices to primarily absorb oil or fine dust. Therefore, when used for a long period of time, oil and fine dust are combined to flow downward, which may cause serious hygiene concerns and may also be exposed to the risk of fire.

RELATED ART DOCUMENT

Patent Document

Korean Unexamined Patent Application Publication No. 10-2014-0101193

DISCLOSURE

Technical Problem

An object of the present invention is to provide a manufacturing method of an oleophobic and hydrophobic film on a 3000 series aluminum alloy without pre-patterning process.

Another object of the present invention is to provide a 3000 series aluminum alloy on which an oleophobic and hydrophobic film manufactured by the above-described manufacturing method is formed.

Technical Solution

In order to achieve the above-described object, the present invention provides a manufacturing method of an oleophobic and hydrophobic film on a 3000 series aluminum alloy including: a step of performing primary anodic oxidation on a 3000 series aluminum alloy for 1 to 10 minutes at 35 to 45 V (step 1); a step of performing pore widening by immersing the alloy in 0.05 to 1.0 M phosphoric acid ($H_3PO_4$) solution for 10 to 60 minutes (step 2); a step of performing secondary anodic oxidation for 1 to 10 minutes at 35 to 45 V (step 3); and a step of coating with a coating composition including a cross-linked polydimethylsiloxane (PDMS) derivative represented by Chemical Formula 1 and an organic solvent (step 4), and prior to step 1, a pre-patterning process is omitted.

[Chemical Formula 1]

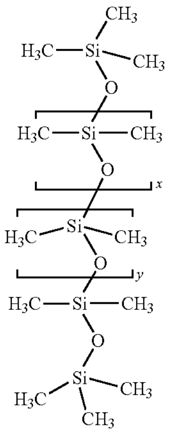

(In Chemical Formula 1, x and y are each an integer of 1 to 30)

Further, the present invention provides a 3000 series aluminum alloy with an oleophobic and hydrophobic film manufactured by the manufacturing method of the present invention.

Advantageous Effects

According to the present disclosure, the manufacturing method of a superhydrophilic anodic oxide film on a 3000 series aluminum alloy can manufacture a uniform anodic oxide film even without a pre-patterning step, thereby reducing manufacturing costs, can impart superhydrophobicity and superoleophobicity to the anodic oxide film according to a coating composition using a cross-linked PDMS derivative represented by Chemical Formula 1 and an organic solvent in a specific mixing ratio and the coating composition has an inexpensive manufacturing cost and adjusts a coating film thickness to several to several tens of nm to be applied to the coating of a microstructured oxide film.

DESCRIPTION OF DRAWINGS

FIG. 1 is an image obtained by capturing a top view of a specimen which has undergone only up to a primary anodic oxidation treatment (step 1) under conditions of Fabricate Examples 1-1 to 1-10 with the field-emission scanning electron microscope (FE-SEM).

FIG. 2 is an image obtained by capturing a cross view of a specimen which has undergone only up to a primary anodic oxidation process (step 1) under conditions of Fabricate Examples 1-1 to 1-10 with the field-emission scanning electron microscope (FE-SEM).

FIG. 3 is an image obtained by capturing a top view of a specimen which has undergone only up to pore widening (step 2) in Examples 1-1 to 1-8 with the field-emission scanning electron microscope (FE-SEM).

FIG. 4 is an image obtained by capturing a cross view of a specimen which has undergone only up to pore widening (step 2) in Examples 1-1 to 1-8 with the field-emission scanning electron microscope (FE-SEM).

FIG. 5 is an image obtained by capturing a tilted view of a specimen which has undergone only up to pore widening (step 2) in Examples 1-1 to 1-8 with the field-emission scanning electron microscope (FE-SEM).

FIG. 6 is an image obtained by capturing a top view of a specimen which has undergone all to secondary anodic oxidation (step 3) in Examples 1-1 to 1-8 with the field-emission scanning electron microscope (FE-SEM).

FIG. 7 is an image obtained by capturing a cross view of a specimen which has undergone all to secondary anodic oxidation (step 3) in Examples 1-1 to 1-8 with the field-emission scanning electron microscope (FE-SEM).

FIG. 8 is an image obtained by capturing a tilted view of a specimen which has undergone all to secondary anodic oxidation (step 3) in Examples 1-1 to 1-8 with the field-emission scanning electron microscope (FE-SEM).

FIG. 9 is a graph illustrating a result of measuring contact angles of a specimen which has undergone all to secondary anodic oxidation (step 3) in Examples 1-1 to 1-8 with water (purified water) and oil (cooking oil).

FIG. 10 is a graph illustrating a result of measuring contact angles and contact hysteresis angles of a specimen according to Examples 2-1 to 2-8 with water (purified water) and oil (cooking oil).

MODES OF THE INVENTION

The present invention provides a manufacturing method of an oleophobic and hydrophobic film on a 3000 series aluminum alloy, including a step of performing primary anodic oxidation on a 3000 series aluminum alloy for 1 to 10 minutes at 35 to 45 V (step 1); a step of performing pore widening by immersing the alloy in 0.05 to 1.0 M phosphoric acid ($H_3PO_4$) solution for 10 to 60 minutes (step 2); a step of performing secondary anodic oxidation for 1 to 10 minutes at 35 to 45 V (step 3); and a step of coating with a coating composition including a cross-linked polydimethylsiloxane (PDMS) derivative represented by Chemical Formula 1 and an organic solvent (step 4), and prior to step 1, a pre-patterning process is omitted.

[Chemical Formula 1]

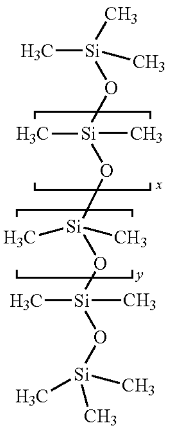

(In Chemical Formula 1, x and y are each an integer of 1 to 30).

In the manufacturing method according to the present invention, the steps 1 to 3 are manufacturing steps for forming an anodic oxide film with a pillar-on-pore (POP) structure on a 3000 series aluminum alloy surface by anodic oxidation and pore widening. Here, the anodic oxide film exhibits hydrophilicity and the anodic oxide film with POP structure according to the present invention exhibits superhydrophilicity. Here, the coating composition according to Step 4 is intended to impart oleophobicity and hydrophobicity and its technical feature is that the coating composition is coated on a micronano surface with POP structure as thin as a thickness of a monomolecular layer to maintain a micronano surface structure of the anodic oxide film, thereby maximizing the oleophobic and hydrophobic effects.

As the 3000 series aluminum alloy, Al 3003, Al 3004, Al 3005, Al 3015, Al 3103, Al3104, and Al 3105 may be used.

The anodic oxide film exhibits hydrophilicity and the anodic oxide film with a pillar-on-pore micro structure according to steps 1 to 3 of an exemplary embodiment of the present disclosure in which pillars are formed on a pore structure may exhibit superhydrophilicity of a contact angle of 10° or smaller.

The pre-patterning process is a process of removing an anodic oxide film by anodically oxidizing and then etching the 3000 series aluminum alloy to remain a microstructure pattern on a surface of the 3000 series aluminum alloy.

According to a method for forming an anodic oxide film on a surface of a metal base by the anodic oxidation of the related art, generally, the pre-patterning process is performed to form a microstructure pattern on a surface of a metal base and then anodic oxidation is performed. This is intended to uniformly form the anodic oxide film which is formed by the anodic oxidation which is a post-process along a microstructure pattern of the surface of the metal base which is performed by the pre-patterning process.

An object of the present invention is to provide a method for uniformly forming an anodic oxide film even without the pre-patterning process and the pre-patterning process is omitted to achieve a significant advantage in reducing manufacturing costs.

Desirably, the method may include a step of performing primary anodic oxidation on a 3000 series aluminum alloy for 3 to 7 minutes at 38 to 42 V (step 1); a step of performing pore widening by immersing the alloy in 0.05 to 0.15 M phosphoric acid ($H_3PO_4$) solution for 30 to 45 minutes (step 2); and a step of performing secondary anodic oxidation for 3 to 7 minutes at 38 to 42 V (step 3).

More desirably, the method may include a step of performing primary anodic oxidation on a 3000 series aluminum alloy for 3 to 5 minutes at 39 to 41 V (step 1); a step of performing pore widening by immersing the alloy in 0.06 to 0.14 M phosphoric acid ($H_3PO_4$) solution for 33 to 42 minutes (step 2); and a step of performing secondary anodic oxidation for 3 to 5 minutes at 39 to 41 V (step 3).

Most desirably, the method may include a step of performing primary anodic oxidation on a 3000 series aluminum alloy for 3.8 to 4.2 minutes at 39.5 to 40.5 V (step 1); a step of performing pore widening by immersing the alloy in 0.095 to 0.105M phosphoric acid ($H_3PO_4$) solution for 34 to 41 minutes (step 2); and a step of performing secondary anodic oxidation for 3.8 to 4.2 minutes at 39.5 to 40.5 V (step 3).

Problems in that uniform anodic oxide film is not formed or the superhydrophilicity is not achieved may occur out of the treatment conditions of steps 1 to 3 described above.

The anodic oxidation process is performed by applying an anode electrode with the 3000 series aluminum alloy to be anodic-oxidized as a working electrode and then applying a cathode electrode with a platinum (Pt) or carbon electrode as a counter electrode, in an oxidation reaction tank containing an electrolyte at −5 to 30° C., to oxidize it. The distance between the working electrode and the counter electrode may be 1 to 15 cm, desirably 3 to 12 cm, more desirably 4 to 10 cm, more desirably 4.5 to 8 cm, and the most desirably 4.75 to 5.25 cm.

As electrolytes for the primary anodic oxidation and the secondary anodic oxidation, sulfuric acid ($H_2SO_4$), phosphoric acid ($H_3PO_4$), oxalic acid ($C_2H_2O_4$), chromic acid, hydrofluoric acid, or dipotassium phosphate ($K_2HPO_4$) may be used either alone or in combination of two or more.

The electrolyte may use desirably 0.1 to 0.5 M oxalic acid of −5 to 25° C., more desirably 0.27 to 0.33 M oxalic acid of 15 to 25° C., and most desirably 0.285 to 0.315 M oxalic acid of 19 to 21° C.

In the coating composition used in the step 4, the organic solvent may be pentane, hexane, heptane, or octane, used alone or in a combination of two or more and in the present invention, hexane is used as an example.

Desirably, the coating composition used in the step 4 may contain 0.01 to 10 parts by weight of a cross-linked PDMS (polydimethylsiloxane) derivative represented by Chemical Formula 1, based on 10 parts by weight of the organic solvent.

More desirably, the coating composition used in the step 4 may contain 0.04 to 5 parts by weight of a cross-linked PDMS (polydimethylsiloxane) derivative represented by Chemical Formula 1, based on 10 parts by weight of the organic solvent.

More desirably, the coating composition used in the step 4 may contain 0.04 to 2 parts by weight of a cross-linked PDMS (polydimethylsiloxane) derivative represented by Chemical Formula 1, based on 10 parts by weight of the organic solvent.

Still more desirably, the coating composition used in the step 4 may contain 0.04 to 1 parts by weight of a cross-linked PDMS (polydimethylsiloxane) derivative represented by Chemical Formula 1, based on 10 parts by weight of the organic solvent.

The most desirably, the coating composition used in the step 4 may contain 0.05 to 0.17 parts by weight of a cross-linked PDMS (polydimethylsiloxane) derivative represented by Chemical Formula 1, based on 10 parts by weight of the organic solvent.

If the content of the cross-linked PDMS derivative represented by Chemical Formula 1 is out of the above-mentioned range, there may be problems in that the oleophobicity and the hydrophobicity are degraded or the coating uniformity is insufficient.

The coating composition according to the present invention does not contain the PMDS (polydimethylsiloxane) derivative represented by the following Chemical Formula 2.

[Chemical Formula 2]

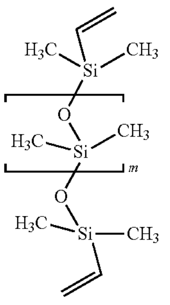

(In Chemical Formula 2, m is an integer of 1 to 100, desirably an integer of 1 to 80, and more desirably an integer of 1 to 60).

The coating composition may be used for drop coating, deep coating, and spin coating, but is not limited thereto.

Further, the present invention provides a 3000 series aluminum alloy on which an oleophobic and hydrophobic film manufactured by the above-described manufacturing method is formed.

Best Mode for Carrying Out the Invention

Hereinafter, the present invention will be described in more detail with reference to following Examples. However, the following Examples are set forth to illustrate the present invention but are not to be construed to limit the present invention.

<Examples 1-1 to 1-8> Manufacture of Anodic Oxide Film With Pillar-on-Pore (POP) Structure by Anodic Oxidation of Aluminum 3003 Alloy According to a method for forming an anodic oxide film on a surface of a metal base by the anodic oxidation of the related art, it is common to perform the pre-patterning process to form a microstructure pattern on a surface of a metal base and then perform anodic oxidation. The pre-patterning process is a process of performing anodic oxidation on the metal base to form an anodic oxide film and then etching the anodic oxide film to remove the formed oxide film, thereby remaining a microstructure pattern on a surface of a base material. The pre-patterning process is intended to uniformly form the anodic oxide film which is formed by the anodic oxidation which is a post-process, along a microstructure pattern of the surface of the base material formed by the pre-patterning process.

An object of the present invention is to provide a method for uniformly forming an anodic oxide film even without the pre-patterning process and the pre-patterning process is omitted to achieve a significant advantage in reducing manufacturing costs.

Specifically, according to the present invention, in order to form the anodic oxide film using an aluminum 3003 alloy as a base material by omitting the pre-patterning process and find out an anodic oxidation treatment condition to form the anodic oxide film with a pillar-on-pore (hereinafter, POP) structure in which a bundle of pillars is formed on a pore structure of the anodic oxide film, the followings are carried out.

Constituent information of the aluminum 3003 alloy (Al 3003, size 20×30 mm, manufactured by Alcoa INC, USA) is as follows:

| Chemical Composition | |
|---|---|
| Aluminum 3003 alloy | Spec: BS EN 573-3:2009 |
| Chemical component | wt % |
| Other components (total) | 0.0 to 0.15 |
| Cobalt (Co) | 0.05 to 0.20 |
| Hydrogen (H) | 0.0 to 0.70 |
| Magnesium (Mg) | 1.00 to 1.50 |
| Silicon + iron (Si + Fe) | 0.0 to 0.60 |
| Zirconium (Zr) | 0.0 to 0.10 |
| Other component (each) | 0.0 to 0.05 |
| Aluminum (Al) | Residual amount |

In order to remove impurities on a surface of the aluminum 3003 alloy, the alloy was washed by ultrasonic treatment in acetone at 20° C. for 10 minutes and in ethanol for 10 minutes.

Next, in order to achieve a surface roughness, the ultrasonically washed aluminum 3003 alloy was placed in a mixed solution of ethanol and perchloric acid (Junsei, $HClO_4$:$C_2H_5OH$=4:1 (v/v)) and electrochemically polished for 1 minute at room temperature (20° C.) by applying a voltage of 20 V. The aluminum alloy surface on which the electrochemical polishing was finished was confirmed to be flat with good reflection.

Step 1: Primary Anodic Oxidation

The electrochemically polished aluminum 3003 alloy (a thickness of 1 mm and a size of 20×30 mm) was used as a working electrode and a platinum (Pt) electrode was used as a cathode electrode and a distance between two electrodes was constantly maintained to be 5 cm to carry out the primary anodic oxidation. The primary anodic oxidation was performed using 0.3 M oxalic acid as the electrolyte while maintaining a temperature of the electrolyte constant at 20° C. using a double beaker. In order to suppress the disruption of stable oxide growth due to local temperature increase, stirring was performed at a constant speed, and the primary anodic oxidation process was performed by applying a voltage of 40 V for 1 to 10 minutes using a constant voltage method to grow an alumina layer.

Step 2: Pore Widening (PW)

The alumina layer which was grown by the primary anodic oxidation was subject to the pore widening (PW) process to immerse the alumina layer in 0.1 M phosphoric acid solution at 30° C. for 10 to 60 minutes before performing the secondary anodic oxidation.

Step 3: Secondary Anodic Oxidation

The same process as the primary anodic oxidation was performed, but the secondary oxidation process was performed by fixing a voltage applying time to 4 minutes to further grow the alumina layer.

The primary anodic oxidation (step 1), the pore widening (step 2), and the secondary anodic oxidation (step 3) processes were performed under the condition of the following Table 1 to manufacture an anodic oxide film with a microstructure on a surface of the aluminum 3003 alloy.

TABLE 1

| | Primary anodic oxidation (step 1) | | Pore widening (step 2) | Secondary anodic oxidation (step 3) | |
|---|---|---|---|---|---|
| | Voltage (V) | Time (min) | Time (min) | Voltage (V) | Time (min) |
| Fabricate Ex. 1-1 | 40 | 1 | — | — | — |
| Fabricate Ex. 1-2 | | 2 | | | |
| Fabricate Ex. 1-3 | | 3 | | | |
| Fabricate Ex. 1-4 | | 4 | | | |
| Fabricate Ex. 1-5 | | 5 | | | |
| Fabricate Ex. 1-6 | | 6 | | | |
| Fabricate Ex. 1-7 | | 7 | | | |
| Fabricate Ex. 1-8 | | 8 | | | |
| Fabricate Ex. 1-9 | | 9 | | | |
| Fabricate Ex. 1-10 | | 10 | | | |
| Example 1-1 | 40 | 4 | 10 | 40 | 4 |
| Example 1-2 | | | 20 | | |
| Example 1-3 | | | 30 | | |
| Example 1-4 | | | 35 | | |
| Example 1-5 | | | 40 | | |
| Example 1-6 | | | 45 | | |
| Example 1-7 | | | 50 | | |
| Example 1-8 | | | 60 | | |

<Experimental Example 1> Analysis of Microstructure of Anodic Oxide Film (1) Analysis of Microstructure and Thickness of Anodic Oxide Film According to Primary Anodic Oxidation Treatment Time Fabricate Examples 1-1 to 1-10 of Table 1 were specimens which have undergone only up to the primary anodic oxidation (step 1) and a surface (top view) and a cross-sectional surface (cross-view) thereof were observed using the field-emission scanning electronic microscope (FE-SEM) system (AURIGA®, small dual-beam FIB-SEM, Zeiss).

Specifically, each aluminum alloy anodic oxide film specimen was cut into small pieces and then fixed onto a stage with a carbon tape, and then coated with gold (Au) for 15 seconds by sputtering, and then imaged using the field-emission scanning electron microscope (SEM). At this time, a surface and a cross-sectional structure of the aluminum alloy anodic oxide film were observed by bending the film specimen at 90° to create parallel cracks.

FIG. 1 is an image obtained by capturing a top view of a specimen which has undergone only up to a primary anodic oxidation treatment (step 1) under conditions of Fabricate Examples 1-1 to 1-10 with the field-emission scanning electron microscope (FE-SEM).

FIG. 2 is an image obtained by capturing a cross view of a specimen which has undergone only up to a primary anodic oxidation process (step 1) under conditions of Fabricate Examples 1-1 to 1-10 with the field-emission scanning electron microscope (FE-SEM).

As illustrated in FIG. 1, in a surface (top view) image, white (bright gray) anodic oxide materials were formed by black pores so that it was confirmed that the porous anodic oxide film was formed on the surface.

As illustrated in FIG. 2, it is confirmed that a smooth lower portion in a cross-sectional (cross-view) image is an aluminum 3003 alloy and an upper portion is an anodic oxide film formed by the primary anodic oxidation process and has a porous pillar shape. It is confirmed that the longer the primary anodic oxidation time, the larger the thickness of the formed anodic oxide film.

When the anodic oxidation is performed, the thickness of the anodic oxide film is increased and when the pore widening is performed, a diameter of pore is increased and a part of an upper portion of the film is cut out to reduce a thickness somewhat. In the present invention, from the viewpoint that the thickness of the anodic oxide film in the final specimen through the primary anodic oxidation-pore widening-secondary anodic oxidation must be at least 500 to 700 nm to secure durability and superhydrophilicity due to the microstructure, it was determined that it was the most desirable to ensure the thickness of 300 to 400 nm by setting the primary anodic oxidation to 4 minutes.

(2) Analysis of Microstructure and Thickness of Anodic Oxide Film According to Pore Widening Time Examples 1-1 to 1-8 of Table 1 were specimens which have undergone only up to the pore widening (step 2) and a surface (top view) and a cross-sectional surface (cross-view) thereof were observed using the field-emission scanning electronic microscope (FE-SEM) system (AURIGA®, small dual-beam FIB-SEM, Zeiss).

FIG. 3 is an image obtained by capturing a top view of a specimen which has undergone only up to pore widening (step 2) in Examples 1-1 to 1-8 with the field-emission scanning electron microscope (FE-SEM).

FIG. 4 is an image obtained by capturing a cross view of a specimen which has undergone only up to pore widening (step 2) in Examples 1-1 to 1-8 with the field-emission scanning electron microscope (FE-SEM).

FIG. 5 is an image obtained by capturing a tilted view of a specimen which has undergone only up to pore widening (step 2) in Examples 1-1 to 1-8 with the field-emission scanning electron microscope (FE-SEM).

As illustrated in FIG. 3, in the surface (top view) image, it is confirmed that the diameter of the black pore is larger than that of FIG. 1 and the longer the pore widening time, the larger the pore diameter. It is further confirmed that shapes of surface pores vary depending on the pore widening time. In the meantime, it is confirmed that in the specimen which has undergone the pore widening for 60 minutes, most of the anodic oxide film was etched to be removed.

As illustrated in FIG. 4, it is confirmed that a thickness of the anodic oxide film was slightly reduced as compared with FIG. 2 (specimen processed for 4 minutes) by the pore widening. Further, it is confirmed that a microstructure shape above the anodic oxide film varies according to the pore widening time.

In FIG. 5, results similar to FIGS. 3 and 4 are confirmed.

(3) Analysis of Microstructure and Thickness of Anodic Oxide Film According to Secondary Anodic Oxidation Treatment Examples 1-1 to 1-8 of Table 1 above were specimens which have undergone all to the secondary anodic oxidation (step 3) and a surface (top view) and a cross-sectional surface (cross-view) thereof were observed using the field-emission scanning electronic microscope (FE-SEM) system (AURIGA®, small dual-beam FIB-SEM, Zeiss).

FIG. 6 is an image obtained by capturing a top view of a specimen which has undergone all to secondary anodic oxidation (step 3) in Examples 1-1 to 1-8 with the field-emission scanning electron microscope (FE-SEM).

FIG. 7 is an image obtained by capturing a cross view of a specimen which has undergone all to secondary anodic oxidation (step 3) in Examples 1-1 to 1-8 with the field-emission scanning electron microscope (FE-SEM).

FIG. 8 is an image obtained by capturing a tilted view of a specimen which has undergone all to secondary anodic oxidation (step 3) in Examples 1-1 to 1-8 with the field-emission scanning electron microscope (FE-SEM).

As illustrated in FIG. 6, the surface (top view) image is similar to that of FIG. 3 so that it is confirmed that the secondary anodic oxidation does not have any significant effect on an upper microstructure of the anodic oxide film formed by the primary anodic oxidation and pore widening.

As illustrated in FIG. 7, in the cross-sectional (cross-view) image of a specimen which has undergone pore widening for 35 minutes, a smooth lower portion is an aluminum 3003 alloy. A thickness represented with a yellow arrow is a film formed by the secondary anodic oxidation and shows a porous pillar shape. An upper portion thereof is a film formed by the primary anodic oxidation and the pore widening and has a pillar shape. As seen from FIG. 7, it is considered that the POP microstructure appears well in the specimen processed by pore widening for 35 to 40 minutes (specifically, 40 min).

In FIG. 8, results similar to FIGS. 6 and 7 are confirmed.

From the result of Experimental Example 1, it is determined that desirably, the primary anodic oxidation is performed for 4 minutes at an application voltage of 40 V, the pore widening is performed for 35 to 40 minutes, and the secondary anodic oxidation is performed for 4 minutes at an application voltage of 40 V.

<Experimental Example 2> Evaluation of Contact Angle of Examples 1-1 to 1-8

Contact angles of specimens of Examples 1-1 to 1-8 with water (purified water) and oil (cooking oil) were measured and a result thereof was represented in the following Table 2 and FIG. 9.

TABLE 2

| | Pore widening | Contact angle (°) | |
|---|---|---|---|
| | time (min) | Water | Oil |
| Example 1-1 | 10 | 19.71 ± 1.71 | 31.87 ± 2.62 |
| Example 1-2 | 20 | 18.01 ± 3.78 | 25.33 ± 1.24 |
| Example 1-3 | 30 | 16.04 ± 2.94 | 19.02 ± 2.69 |
| Example 1-4 | 35 | 8.73 ± 0.98 | 9.98 ± 1.63 |
| Example 1-5 | 40 | None | None |
| Example 1-6 | 45 | 12.18 ± 4.38 | 14.52 ± 1.79 |
| Example 1-7 | 50 | 16.37 ± 1.07 | 24.62 ± 3.75 |
| Example 1-8 | 60 | 19.30 ± 1.39 | 27.99 ± 1.11 |

* None means that a contact angle is close to 0, so that the measurement is not possible.

FIG. 9 is a graph illustrating a result of measuring contact angles of a specimen which has undergone all to secondary anodic oxidation (step 3) in Examples 1-1 to 1-8 with water (purified water) and oil (cooking oil).

As represented in Table 2 and FIG. 9, it was confirmed that a specimen which had contact angles with water and oil of 10° or smaller to exhibit the superhydrophilicity was two specimen of Examples 1-4 and 1-5, which matched a result expected from the result of Experimental example 1.

<Experimental Example 3> Evaluation of Coating Composition for Imparting Superhydrophobic and Superoleophobic Functionality A coating composition used to impart superhydrophobic and superoleophobic functionality to specimens of Examples 1-1 to 1-8 was evaluated.

Specifically, an aluminum 3003 alloy which had undergone only up to the electrochemical polishing process described in Examples was prepared as a metal base. That is, the anodic oxidation was not performed.

As coating agents, 60 μL of SYLGARD 184 Silicon Elastomer Curing Agent (manufactured by Dow chemical company) which was a cross-linked PDMS derivative represented by Chemical Formula 1 and SYLGARD 184 Silicon Elastomer base (manufactured by Dow chemical company) which was a PDMS derivative represented by Chemical Formula 2 and/or hexane was dropped on the electrochemically polished aluminum 3003 alloy for every base material size of 2.5 cm×3 cm, and then the aluminum 3003 alloy was coated by spin coating method (corresponding to Examples 2, 4, 6, and 7). The spin coating was performed at 1000 rpm for 30 seconds. Further, as another coating method, drop coating was performed (corresponding to Examples 1, 3, 5, and 8 to 10). For the drop coating, after dropping an appropriate amount of coating agent, the base material was tilted to the left and right several times to be coated.

In Fabricate Examples 2-1 to 2-4, as a coating agent, hexane, a main agent (base) (Chemical Formula 2), and a curing agent (Chemical Formula 1) were mixed and in Fabricate Examples 2-5 to 2-10, as a coating agent, a mixture of hexane and a curing agent (Chemical Formula 1) was used.

Next, the coated base material was thermally treated for 30 minutes in an oven of 300° C. to complete the curing.

For reference, the following coating composition of Fabricate Examples 2-1 to 2-10 was a composition used in prior application (Application No. 10-2021-0085454) of the inventor of this invention.

TABLE 3

| | Composition of coating agent (weight ratio) | | | | |
|---|---|---|---|---|---|
| Fabricate | | Coating agent (SYLGARD 184) | | Coating | Amount of used coating liquid |
| Example | Hexane | Base | Curing agent | method | (μL/7.5 $cm^2$) |
| 2-1 | 10 | 1 | 0.1 | drop | 65 |
| 2-2 | 10 | 1 | 0.1 | spin | 65 |
| 2-3 | 10 | 2 | 0.2 | drop | 65 |
| 2-4 | 10 | 2 | 0.2 | spin | 65 |
| 2-5 | 10 | 0 | 1 | drop | 65 |
| 2-6 | 10 | 0 | 1 | spin | 65 |
| 2-7 | 10 | 0 | 1 | spin | 65 |
| 2-8 | 10 | 0 | 1 | drop | 85 |
| 2-9 | 10 | 0 | 0.5 | drop | 85 |
| 2-10 | 10 | 0 | 0.1 | drop | 85 |

[Chemical Formula 1: Curing agent]

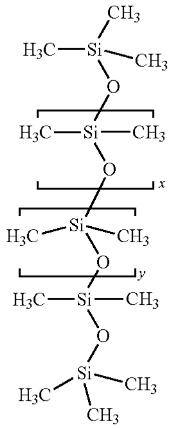

In Chemical Formula 1, x and y are each an integer of 1 to 30.

[Chemical Formula 2: Base]

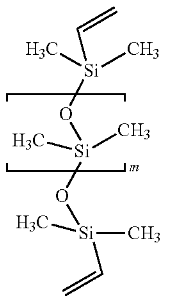

In Chemical Formula 2, m is an integer of 1 to 100.

Water (purified water) and oil (cooking oil) were dropped on the specimens of Fabricate Examples 2-1 to 2-10 to evaluate a contact angle and a contact hysteresis angle and results were represented in the following Table 4.

Here, the 'contact hysteresis angle' was obtained by measuring an inclination angle at which a sample was placed on a stage of a device whose inclination may be finely adjusted, water or oil was dropped on the sample, and then the stage was gradually tilted so that water or oil began to flow down. That is, it may be said that the smaller the contact hysteresis angle, the better the hydrophobicity/oleophobicity. For example, when the contact hysteresis angle is 1°, water or oil flows down even if the sample is tilted by only 1°, and when the contact hysteresis angle is 90°, water or oil does not flow down even if the sample is erected at 90°.

The following Table 4 is a result obtained by evaluating the hydrophobicity and oleophobicity after coating a coating liquid according to Fabricate Examples 2-1 to 2-10 on a base material on which a micro-structured oxide film was not formed on a surface as a sample of the aluminum 3003 alloy base material on which the anodic oxidation was not performed.

TABLE 4

| | Water | | Oil | |
|---|---|---|---|---|
| Unanodic-oxidized base | Contact angle (0 second) | Contact hysteresis angle | Contact angle (60 seconds) | Contact hysteresis angle |
| Fabricate Example 2-1 | 107.59 ± 1.31° | 29.11 ± 0.44° | 60.56 ± 0.43° | 25.74 ± 0.41° |
| Fabricate Example 2-2 | 104.57 ± 0.35° | 25.65 ± 0.58° | 61.05 ± 0.67° | 26.95 ± 0.64° |
| Fabricate Example 2-3 | 99.57 ± 0.22° | 27.43 ± 0.75° | 57.05 ± 1.05° | 27.56 ± 0.37° |
| Fabricate Example 2-4 | 100.28 ± 1.24° | 27.91 ± 0.94° | 54.87 ± 1.44° | 27.79 ± 0.09° |
| Fabricate Example 2-5 | 102.66 ± 0.80° | 22.20 ± 0.58° | 60.79 ± 1.38° | 22.12 ± 0.37° |
| Fabricate Example 2-6 | 100.87 ± 3.00° | 28.32 ± 0.85° | 58.44 ± 6.00° | 28.52 ± 2.90° |
| Fabricate Example 2-7 | 103.96 ± 2.83° | 24.19 ± 0.24° | 59.62 ± 1.43° | 24.86 ± 1.40° |
| Fabricate Example 2-8 | 114.13 ± 2.53° | 20.07 ± 0.41° | 58.84 ± 3.10° | 20.60 ± 0.20° |
| Fabricate Example 2-9 | 113.22 ± 1.47° | 19.94 ± 2.20° | 54.55 ± 8.12° | 13.75 ± 1.02° |
| Fabricate Example 2-10 | 114.63 ± 0.18° | 13.66 ± 0.42° | 55.01 ± 2.48° | 10.65 ± 0.92° |
| Not coated | 77.72 ± 4.64° | 41.26 ± 4.31° | 31.67 ± 6.02° | 33.57 ± 0.68° |

As represented in Table 4, the contact hysteresis angle of Fabricate Example 2-10 was the smallest so that it was confirmed that the hydrophobicity/oleophobicity was excellent. Based on this result, in the Experimental Example 4 to be described below, a coating composition according to Fabricate Example 2-10 was used.

<Experimental Example 4> Evaluation of Hydrophobicity and Oleophobicity of Specimen in which Coating Composition of Fabricate Example 2-10 is Coated on Specimen of Examples 1-1 to 1-8

The coating composition according to Fabricate Example 2-10 was coated on aluminum 5052 alloy with microstructure anodic oxide film obtained in Examples 1-1 to 1-8 as a base material. The detailed coating process was the same as in Experimental Example 3.

Water (purified water) and oil (cooking oil) were dropped on the coated specimens (Examples 2-1 to 2-8) to evaluate a contact angle and a contact hysteresis angle and results were represented in the following Table 5 and FIG. 10.

Here, if the metal base is subject to the anodic oxidation to form the POP microstructure on a surface, a superhydrophilic oxide film is formed. This is an effect caused by oxygen atoms included in the oxide film and the microstructure. If the hydrophobic coating is performed on the microstructure oxide film with a thickness as thin as a monomolecular film to maintain the microstructure, superhydrophobicity may be achieved.

FIG. 10 is a graph illustrating a result of measuring contact angles and contact hysteresis angles of a specimen according to Examples 2-1 to 2-8 with water (purified water) and oil (cooking oil).

TABLE 5

| | Water (°) | | Oil (°) | |
|---|---|---|---|---|
| | Contact angle (0 second) | Contact hysteresis angle | Contact angle (0 second) | Contact hysteresis angle |
| Example 2-1 | 112.16 ± 2.43 | 19.03 ± 3.83 | 70.51 ± 1.68 | 20.81 ± 1.81 |
| Example 2-2 | 118.51 ± 2.37 | 16.18 ± 3.73 | 71.65 ± 2.04 | 17.78 ± 2.20 |
| Example 2-3 | 127.09 ± 6.60 | 12.73 ± 2.88 | 74.23 ± 3.85 | 14.16 ± 1.74 |
| Example 2-4 | 144.77 ± 5.77 | 8.00 ± 1.56 | 78.40 ± 0.92 | 8.90 ± 1.25 |
| Example 2-5 | 169.30 ± 6.41 | 3.64 ± 1.05 | 81.01 ± 2.52 | 6.83 ± 2.45 |
| Example 2-6 | 131.64 ± 4.72 | 10.00 ± 1.80 | 76.81 ± 0.25 | 13.48 ± 0.59 |
| Example 2-7 | 125.86 ± 3.76 | 15.67 ± 2.21 | 72.70 ± 5.23 | 16.91 ± 2.93 |
| Example 2-8 | 118.01 ± 1.15 | 16.89 ± 1.73 | 70.65 ± 5.63 | 21.14 ± 3.06 |

As represented in Table 5 above, it was confirmed that the contact hysteresis angle of Examples 2-4 and 2-5 exhibited superhydrophobicity and superoleophobicity and specifically, Example 2-5 showed excellent effect.

<Experimental Example 5> Deduction of Optimal Mixing Ratio of Cross-linked PDMS Derivative of Chemical Formula 1 and Hexane Suitable to be Coated on Base Material with Microstructure Oxide Film From the results of Experimental Examples 3 and 4 above, it was confirmed that the sample of Fabricate Example 2-10 had excellent hydrophobicity and oleophobicity as well as excellent coatability and also formed a coating film thickness to be thin sufficient to maintain the microstructure.

Accordingly, in Experimental Example 5, in order to derive an optimal mixing ratio of a cross-linked PDMS derivative of Chemical Formula 1 and hexane suitable to be coated on a base material with a microstructure oxide film formed thereon, a contact hysteresis angle experiment was performed in the same manner as Experimental Example 3 and the result was represented in Table 6.

In the following Table 6, a curing agent and hexane of the coating agent were measured and indicated by weight ratio, and the base material was aluminum 3003 alloy formed with a POP microstructured oxide film obtained in Example 1-5 and similar to Fabricate Example 2-10, plasma treatment was not conducted, but drop coating was conducted to prepare a sample.

TABLE 6

| Example | Weight ratio of coating agent mixture | | Contact hysteresis angle (°) | |
|---|---|---|---|---|
| | Hexane | Curing agent (Chemical Formula 1) | Water | Oil |
| 3-1 | 10 | 0.01 | 17.62 ± 0.12 | 19.2 ± 0.41 |
| 3-2 | 10 | 0.03 | 16.51 ± 0.81 | 18.2 ± 0.43 |
| 3-3 | 10 | 0.05 | 3.77 ± 0.52 | 7.04 ± 0.26 |
| 3-4 | 10 | 0.07 | 3.75 ± 0.73 | 7.02 ± 0.64 |
| 3-5 | 10 | 0.1 | 3.64 ± 1.05 | 6.83 ± 2.44 |
| 3-6 | 10 | 0.13 | 3.66 ± 0.56 | 7.14 ± 0.27 |
| 3-7 | 10 | 0.15 | 3.71 ± 0.18 | 7.31 ± 0.49 |
| 3-8 | 10 | 0.17 | 3.95 ± 0.34 | 7.42 ± 0.54 |
| 3-9 | 10 | 0.20 | 14.57 ± 0.51 | 20.5 ± 0.81 |

As represented in Table 6 above, it was confirmed that in Examples 3-3 to 3-8, a coating film thickness was formed to be thin sufficient to maintain the microstructure and the coating film was uniformly formed on the entire base material so that the hydrophobicity and the oleophobicity were significantly excellent. In the meantime, in Examples 3-1 and 3-2, it is expected that the content of the curing agent is too low so that the coating film is not formed in a part of the base material and in Example 3-9, it is expected that the content of the curing agent is too high so that the coating film is too thick to maintain the microstructure.

For now, the present disclosure has been described with reference to the exemplary embodiments. It is understood to those skilled in the art that the present disclosure may be implemented as a modified form without departing from an essential characteristic of the present disclosure. Therefore, the disclosed exemplary embodiments may be considered by way of illustration rather than limitation. The scope of the present invention is presented not in the above description but in the claims and it may be interpreted that all differences within an equivalent range thereto may be included in the present invention.

INDUSTRIAL APPLICABILITY

According to the present disclosure, the manufacturing method of a superhydrophilic anodic oxide film on a 3000 series aluminum alloy may manufacture a uniform anodic oxide film even without a pre-patterning step, thereby reducing manufacturing costs, may impart superhydrophobicity and superoleophobicity to the anodic oxide film according to a coating composition using a cross-linked PDMS derivative represented by Chemical Formula 1 and an organic solvent in a specific mixing ratio and the coating composition has an inexpensive manufacturing cost and adjusts a coating film thickness to several to several tens of nm to be applied to the coating of a microstructured oxide film.

The invention claimed is:

1. A manufacturing method of an oleophobic and hydrophobic film on a 3000 series aluminum alloy, comprising:

a step of performing primary anodic oxidation on a 3000 series aluminum alloy for 1 to 10 minutes at 35 to 45 V (step 1);

a step of performing pore widening by immersing the alloy in 0.05 to 1.0 M phosphoric acid ($H_3PO_4$) solution for 10 to 60 minutes (step 2);

a step of performing secondary anodic oxidation for 1 to 10 minutes at 35 to 45 V (step 3); and a step of coating with a coating composition including a cross-linked polydimethylsiloxane (PDMS) derivative represented by Chemical Formula 1 and an organic solvent (step 4), wherein prior to step 1, a pre-patterning process is omitted,

[Chemical Formula 1]

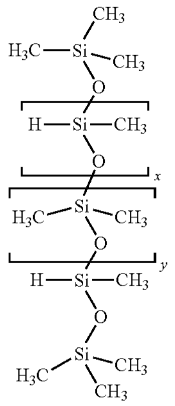

wherein in Chemical Formula 1, x and y are each an integer of 1 to 30.

2. The manufacturing method of claim 1, wherein the 3000 series aluminum alloy is one or more selected from a group consisting of Al 3003, Al 3004, Al 3005, Al 3015, Al 3103, Al 3104, and Al 3105.

3. The manufacturing method of claim 1, wherein the anodic oxide film formed on the 3000 series aluminum alloy surface through steps 1 to 3 has a pillar-on-pore shape in which pillars are formed on a porous structure.

4. The manufacturing method of claim 1, wherein in the pre-patterning process, the 3000 series aluminum alloy is anodic oxidized and then etched to remove the anodic oxide film to remain a microstructure pattern on a surface of the 3000 series aluminum alloy.

5. The manufacturing method of claim 1, wherein the step 1 is performed for 3 to 7 minutes at 38 to 42 V;

the step 2 is performed in 0.05 to 0.15 M phosphoric acid ($H_3PO_4$) solution for 30 to 45 minutes; and the step 3 is performed for 3 to 7 minutes at 38 to 42 V.

6. The manufacturing method of claim 5, wherein the step 1 is performed for 3 to 5 minutes at 39 to 41 V;

the step is performed in 0.06 to 0.14 M phosphoric acid ($H_3PO_4$) solution for 33 to 42 minutes; and the step 3 is performed for 3 to 5 minutes at 39 to 41 V.

7. The manufacturing method of claim 6, wherein the step 1 is performed for 3.8 to 4.2 minutes at 39.5 to 40.5 V;

the step 2 is performed in 0.095 to 0.105 M phosphoric acid ($H_3PO_4$) solution for 34 to 41 minutes; and the step 3 is performed at 39.5 to 40.5 V.

8. The manufacturing method of claim 1, wherein an organic solvent in step 4 is one of pentane, hexane, heptane, and octane.

9. The manufacturing method of claim 1, wherein the coating composition used in the step 4 contains 0.01 to 10 parts by weight of a cross-linked PDMS (Polydimethylsiloxane) derivative represented by Chemical Formula 1, based on 10 parts by weight of the organic solvent.

10. The manufacturing method of claim 9, wherein the coating composition used in the step 4 contains 0.04 to 5 parts by weight of a cross-linked PDMS (Polydimethylsiloxane) derivative represented by Chemical Formula 1, based on 10 parts by weight of the organic solvent.

11. The manufacturing method of claim 10, wherein the coating composition used in the step 4 contains 0.04 to 2 parts by weight of a cross-linked PDMS (Polydimethylsiloxane) derivative represented by Chemical Formula 1, based on 10 parts by weight of the organic solvent.

12. The manufacturing method of claim 11, wherein the coating composition used in the step 4 contains 0.04 to 1 parts by weight of a cross-linked PDMS (Polydimethylsiloxane) derivative represented by Chemical Formula 1, based on 10 parts by weight of the organic solvent.

13. The manufacturing method of claim 12, wherein the coating composition used in the step 4 contains 0.05 to 0.17 parts by weight of a cross-linked PDMS (Polydimethylsiloxane) derivative represented by Chemical Formula 1, based on 10 parts by weight of the organic solvent.

14. The manufacturing method of claim 1, wherein the coating composition used in the step 4 does not contain a polydimethylsiloxane (PDMS) derivative represented by the following Chemical Formula 2-,

[Chemical Formula 2]

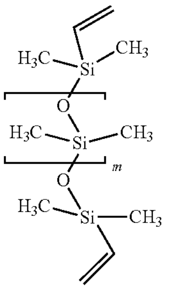

wherein in Chemical Formula 2, m is an integer of 1 to 100.

15. A 3000 series aluminum alloy with an oleophobic and hydrophobic film manufactured by the manufacturing method of claim 1.

* * * * *